(12) United States Patent
Theuwissen

(10) Patent No.: US 8,902,330 B2
(45) Date of Patent: Dec. 2, 2014

(54) METHOD FOR CORRECTING IMAGE DATA FROM AN IMAGE SENSOR HAVING IMAGE PIXELS AND NON-IMAGE PIXELS, AND IMAGE SENSOR IMPLEMENTING SAME

(71) Applicant: Harvest Imaging bvba, Bree (BE)

(72) Inventor: Albert Theuwissen, Bree (BE)

(73) Assignee: Harvest Imaging bvba, Bree (BE)

( * ) Notice: Subject to any disclaimer, the term of this patent is extended or adjusted under 35 U.S.C. 154(b) by 18 days.

(21) Appl. No.: 13/751,204

(22) Filed: Jan. 28, 2013

(65) Prior Publication Data

US 2013/0135500 A1     May 30, 2013

(30) Foreign Application Priority Data

Feb. 6, 2012     (EP) ..................................... 12154113

(51) Int. Cl.
| | | |
|---|---|---|
| H04N 9/73 | (2006.01) | |
| H04N 5/228 | (2006.01) | |
| G06K 9/00 | (2006.01) | |
| H04N 5/217 | (2011.01) | |
| G06T 3/40 | (2006.01) | |
| H04N 9/04 | (2006.01) | |
| H04N 5/359 | (2011.01) | |

(52) U.S. Cl.
CPC ............ *H04N 5/2173* (2013.01); *G06T 3/4015* (2013.01); *H04N 9/045* (2013.01); *H04N 5/2176* (2013.01); *H04N 5/359* (2013.01)
USPC ...................... 348/223.1; 348/222.1; 348/345; 348/225; 382/162; 382/167; 382/255

(58) Field of Classification Search
CPC ......... H04N 9/73; H04N 5/228; H04N 5/232; G06K 9/00
USPC .............. 348/345, 222.1, 333.04, 225.1, 248, 348/243, 223.1, 220.1; 82/162, 167, 255, 82/246; 382/162, 167, 255, 246

See application file for complete search history.

(56) References Cited

U.S. PATENT DOCUMENTS

| | | | |
|---|---|---|---|
| 6,781,632 B1 | 8/2004 | Ide | |
| 2009/0128671 A1* | 5/2009 | Kusaka | .......................... 348/246 |
| 2009/0167927 A1 | 7/2009 | Kusaka | |
| 2012/0092520 A1* | 4/2012 | Proca | .......................... 348/223.1 |

FOREIGN PATENT DOCUMENTS

EP       2091260 A2     8/2009

OTHER PUBLICATIONS

Search Report and Examination in Priority EP 12154113.0, dated Mar. 26, 2012.

* cited by examiner

*Primary Examiner* — Tuan Ho
*Assistant Examiner* — Marly Camargo
(74) *Attorney, Agent, or Firm* — Barnes & Thornburg LLP

(57) ABSTRACT

A method for correcting image data, in particular for color correction and cross-talk reduction of image data obtained by an image sensor comprising image pixels (R, G, B) and non-image pixels (F), the image pixels (R,G,B) being overlaid with a color filter array (CFA) and having a different spectral sensitivity than the non-image pixels, comprises determining a set of color components (rold, gold, bold) for the image pixels (R,G,B) based on raw image data (rraw, graw, braw) read only from the image pixels (R,G,B) of the image sensor (10); correcting the set of color components of non-direct neighbors of the non-image pixels (F) by means of a first color correction matrix (CCM1); and correcting the set of color components of direct neighbors of the non-image pixels by means of a second color correction matrix (CCM2) different from the first color correction matrix. An image sensor (10) and an auto-focus camera using same are also disclosed.

12 Claims, 5 Drawing Sheets

CCM1, CCM2

$$\begin{bmatrix} R_{corr} \\ G_{corr} \\ B_{corr} \end{bmatrix} = \begin{bmatrix} m_{11} & m_{12} & m_{13} \\ m_{21} & m_{22} & m_{23} \\ m_{31} & m_{32} & m_{33} \end{bmatrix} \begin{bmatrix} R_{old} \\ G_{old} \\ B_{old} \end{bmatrix}$$

$$\begin{cases} R_{corr} = m_{11} \cdot R_{old} + m_{12} \cdot G_{old} + m_{13} \cdot B_{old} \\ G_{corr} = m_{21} \cdot R_{old} + m_{22} \cdot G_{old} + m_{23} \cdot B_{old} \\ B_{corr} = m_{31} \cdot R_{old} + m_{32} \cdot G_{old} + m_{33} \cdot B_{old} \end{cases}$$

$$\underset{CCM1, CCM2}{\longrightarrow} \begin{bmatrix} R_{corr} \\ G_{corr} \\ B_{corr} \end{bmatrix} = \begin{bmatrix} m_{11} & m_{12} & m_{13} \\ m_{21} & m_{22} & m_{23} \\ m_{31} & m_{32} & m_{33} \end{bmatrix} \begin{bmatrix} R_{old} \\ G_{old} \\ B_{old} \end{bmatrix}$$

$$\begin{cases} R_{corr} = m_{11} \cdot R_{old} + m_{12} \cdot G_{old} + m_{13} \cdot B_{old} \\ G_{corr} = m_{21} \cdot R_{old} + m_{22} \cdot G_{old} + m_{23} \cdot B_{old} \\ B_{corr} = m_{31} \cdot R_{old} + m_{32} \cdot G_{old} + m_{33} \cdot B_{old} \end{cases}$$

*FIG. 6*

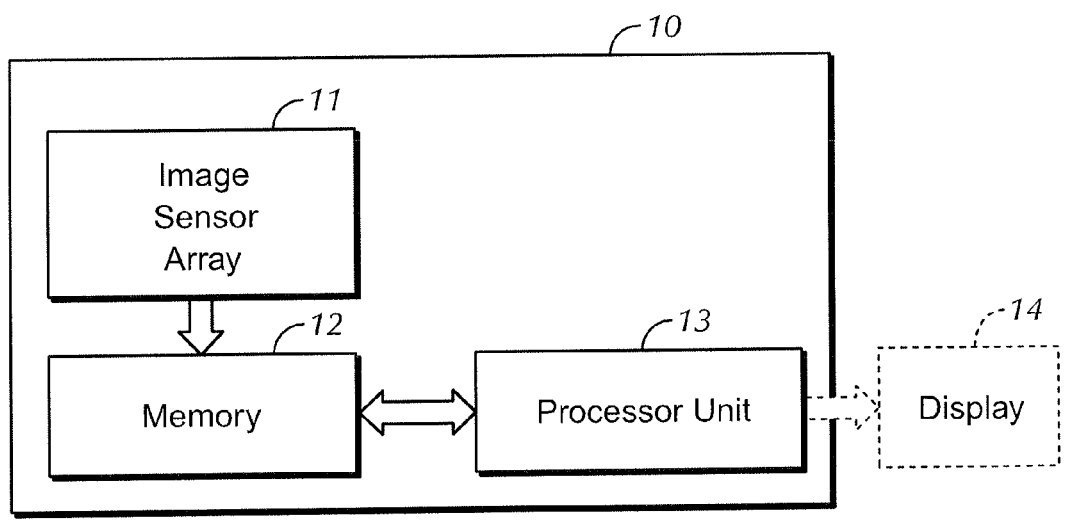

*FIG. 9*

METHOD FOR CORRECTING IMAGE DATA FROM AN IMAGE SENSOR HAVING IMAGE PIXELS AND NON-IMAGE PIXELS, AND IMAGE SENSOR IMPLEMENTING SAME

FIELD OF THE INVENTION

The present invention relates to the field of image sensors for digital cameras. More specifically it relates to a method and device for correcting image data from a solid-state image sensor, e.g. a CMOS image sensor, for reducing e.g. cross-talk of pixels, in particular of pixels located adjacent to non-image pixels.

BACKGROUND OF THE INVENTION

Solid-state image sensors, in particular for example CMOS image sensors are known in the art. Many modern CMOS sensors are overlaid with a colour filter array (CFA) for obtaining three (or more) colour components, e.g. red, green and blue. Commercially the most commonly used CFA configuration is the so called Bayer configuration. It has a pattern of four pixels arranged in a square, two opposite corners being taken by green pixels, the other two corners being taken by a red pixel and a blue pixel, as shown in FIG. 1 (left). Although this configuration takes into account that the human eye is more sensitive to green light than to red or blue light, such image sensors are not perfect, and they do not reproduce exactly the same colours as perceived by the human eye. Because the human eye and the silicon devices use completely different methods to capture information, it is not surprising that the silicon devices do deviate from the human visual system.

Besides differences with the HVS (human visual system), silicon devices also suffer from other artefacts, such as for example cross-talk. Several forms of cross-talk are known in the art, such as spectral cross-talk, optical cross-talk and electrical cross-talk. These provide additional artefacts, which need to be compensated for.

Another aspect of digital cameras is auto-focus. At present there are two major systems for autofocus operation in solid-state cameras:
1) Contrast detection: simple, without extra components in the camera, but slow, consuming quite some power and relative measurements are being taken. This system is used in cheap cameras (e.g. mobile imaging),
2) Phase detection: fast and accurate, but requires extra lenslets and a dedicated sensor, absolute measurements are being taken.

In today's mirror-less cameras, there is a clear need for a high-quality auto-focus system, but without a mirror, so that the classical phase detection method is no longer possible. For that reason, the sensors of these modern cameras are provided with drop-in pixels that can function as auto-focus pixels.

US20090167927 describes a digital camera with such an image sensor having image pixels and non-image pixels. The non-image pixels are different from the surrounding image pixels, and are intended for providing information for auto-focus. They do not contribute to the normal shooting of an image, i.e. they do not provide actual image data. When taking an image with such a sensor, the drop-in pixels are treated as defect pixels, and the image is corrected accordingly. US20090167927 discloses an algorithm for correcting such drop-in pixels, by estimating image information based on image data obtained from surrounding image pixels. However, this algorithm does not correct for cross-talk.

SUMMARY OF THE INVENTION

It is an object of embodiments of the present invention to provide a method and device for correcting image data retrieved from an image sensor comprising a plurality of image pixels and non-image pixels.

In particular, it is an aim of the present invention to provide a method and device for reducing cross-talk in an image sensor comprising image pixels and non-image pixels, e.g. auto-focus pixels.

The above objective is accomplished by a method and device according to embodiments of the present invention.

In a first aspect, the present invention provides a method for correcting image data retrieved from an image sensor comprising a plurality of image pixels and non-image pixels, the image pixels being overlaid with a colour filter array and having a different spectral sensitivity than the non-image pixels. The method comprises:
a) determining a set of colour components for the image pixels based on raw image data read only from the image pixels of the image sensor;
b) determining a corrected set of colour components for the image pixels that are not directly adjacent to the non-image pixels by means of a first colour correction matrix; and
c) determining a corrected set of colour components for image pixels that are directly adjacent to the non-image pixels by means of a second colour correction matrix different from the first colour correction matrix.

It is to be noted that the method steps b) and c) need not necessarily be carried out sequentially and in that order. For example, these steps or parts thereof may be executed in parallel, or the order of some of the steps may be changed.

The method according to embodiments of the present invention reduces the cross-talk of all pixels, including the non-image pixels and their direct neighbours.

It is an advantage of a method according to embodiments of the present invention that by using a single colour matrix operation, e.g. a matrix multiplication, for each image pixel, the colour transformation can be performed, and the cross-talk can be reduced at the same time. This improves the colour fidelity of the end result.

In a method according to embodiments of the present invention, determining a corrected set of colour components for the image pixels may comprise multiplying the set of colour components for each image pixel with the colour correction matrix, whereby the type of colour correction matrix used in the multiplication (first or second) depends on the type of image pixel (directly adjacent to a non-image pixel or not).

It is an advantage that a same function, e.g. a matrix multiplication, can be used for both the image pixels far away from the non-image pixels, and for the image-pixels directly adjacent to the non-image pixels. This is advantageous because it simplifies the implementation, e.g. allowing a same hardware block to be used, albeit with other coefficients. At the same time the need for a more complex algorithm is avoided.

In a method according to embodiments of the present invention, obtaining a set of colour components for the image pixels includes reading raw image data from the image sensor and determining the set of colour components based on the raw image data. In this step, raw image data is obtained for each image pixel, for example a red value for a Red image pixel, a green value for a Green image pixel, and a blue value for a Blue image pixel. When for example a Bayer colour filter array is used, this step results in three sub-images: ¼ subsampled raw red pixels, ¼ subsampled raw blue pixels and 2⁄4 subsampled raw green pixels, except for the locations of the non-image pixels, for which no raw data is available. In step a) of the method, full colours, e.g. red, green and blue values are assigned to each image pixel, using information of the sub-images. In step b) the (yet uncorrected) full colour values of all image pixels that are not directly adjacent to the non-image pixels, are arranged in a N×1 matrix, (e.g. N equals the number of colours, e.g. 3 in case of R, G, B) and corrected, e.g. matrix-multiplied, by a first colour correction matrix CCM1, resulting in a colour transformation. By using a proper colour-correction matrix CCM1, this correction, e.g. by means of matrix-multiplication, at the same time reduces cross-talk for these image pixels.

Special action is needed for the mage pixels at the boundary of the non-image pixels (i.e. adjacent to the non-image pixels), because of the following reasons: 1) the regular pattern of the Colour Filter Array, e.g. the Bayer pattern, is disturbed, 2) the spectral sensitivity of the non-image pixels is different from that of the image pixels, thus the cross-talk from the non-image pixels to the image pixels in the vicinity is different as well. After close investigation, the inventor has found surprisingly that cross-talk for these image pixels directly adjacent to the non-image pixels can be elegantly reduced also by correction via a matrix, e.g. by a matrix-multiplication, despite the above mentioned disturbances. However, a second colour correction matrix, different from the first colour correction matrix needs to be used.

In accordance with embodiments of the present invention, obtaining the set of colour components for each image pixel may include determining at least three colour components for each image pixel, whereby one colour component is assigned the raw image data obtained from the sensor for said image pixel, and the other colour components are determined from raw image data obtained from the sensor for image pixels in the vicinity of said image pixel.

This step is known in the art as demosaicing. This step can be seen as filling the "gaps" in the sub-images of different colour by "estimating" the missing raw values, and then combining e.g. for a red image pixel, the raw red value read from the sensor with an estimated raw green value and an estimated raw blue value. Several methods are known in the art for estimating the missing values, e.g. "nearest neighbour" which simply copies an adjacent pixel of the same colour component, or "bilinear interpolation", whereby the red value of a non-red pixel is computed as the average of two or four adjacent red pixels, and similarly for blue and green.

A method according to embodiments of the present invention may further comprise determining the corrected set of colour components for the non-image pixels.

In a method according to embodiments of the present invention, determining the corrected set of colour components for the non-image pixels may comprise determining the set of colour components for the non-image pixels based on the raw image data of the image pixels; and determining the corrected set of colour components for the non-image pixels by means of a third colour correction matrix. Determining the corrected set of colour components for the non-image pixels may comprise multiplying the set of colour components of said non-image pixels with the third colour correction matrix.

Several alternatives exist for determining image data for the non-image pixels. In this first alternative they are derived from the raw image data, and then corrected by a third colour matrix, the matrix taking into account cross-talk. As for the other colour conversion matrices, the third colour correction matrix also has constant values, which are independent of the image to be taken.

In particular embodiments, determining the corrected set of colour components for the non-image pixels may use raw image data only from image pixels that are not directly adjacent to the non-image pixels, and the third colour correction matrix may be the same as the first colour correction matrix.

Advantage of this approach is that the same first colour matrix can be used (thus simpler implementation, less substrate, e.g. silicon, area or less code), and that the influence of cross-talk caused by the non-image pixels to these pixels being used is minimal, but a disadvantage is that the distance from the respective non-image pixel is larger.

In alternative embodiments, determining the corrected set of colour components for the non-image pixels may use raw image data from at least one image pixel that is directly adjacent to the non-image pixels, and the third colour correction matrix may be the same as the second colour correction matrix.

In a method according to embodiments of the present invention, determining the corrected set of colour components for the non-image pixels may comprise determining the corrected set of colour components for the non-image pixels based on the corrected set of colour components of one or more image pixels in the vicinity of said non-image pixel.

Advantage of this approach is that in this case the use of a third colour conversion matrix can be omitted. As above, the calculation may e.g. be nearest neighbour, or bilinear interpolation, or another technique. The full colour pixels used may be direct neighbours, or not direct neighbours, or a mix thereof.

In a second aspect, the present invention provides an image sensor comprising a plurality of image pixels overlaid with a colour filter array and at least one non-image pixel, the image pixels having a different spectral sensitivity than the non-image pixels, and a processor unit adapted for: a) correcting with a first colour correction matrix a set of colour components of image pixels that are not directly adjacent to the non-image pixels, the set of colour components based on raw image data read only from the image pixels of the image sensor; and b) correcting with a second colour correction matrix a set of colour components of image pixels that are directly adjacent to the non-image pixels, the set of colour components based on raw image data read only from the image pixels of the image sensor. The first colour correction matrix is different from the second colour correction matrix. The first colour correction matrix and the second colour correction matrix have predetermined coefficients.

Such an image sensor may be specifically adapted for carrying out a method according to embodiments of the first aspect of the present invention.

In embodiments of the present invention, the non-image pixels may be pixels that function as auto-focus pixels, having a spectral sensitivity different from the image pixels. Their output may e.g. be used by an auto-focus component for focusing of the lens of the camera to which the image sensor belongs.

In accordance with embodiments of the present invention, the processor unit may be further adapted for determining the corrected set of colour components for the non-image pixel locations.

An image sensor according to embodiments of the present invention may further comprise a memory for storing image data for the image pixels, whereby the processor unit is operatively connected to the memory. The processor unit may further be adapted for determining the set of colour components for the image pixels based on raw image data stored in the memory.

In an image sensor according to embodiments of the present invention, the image pixels may be physically arranged in rows and columns, and the non-image pixels may be physically arranged on at least part of one column or at least part of one row of the image sensor. The non-image pixels may occupy a full row or column, or only a partial row or column.

In an image sensor according to embodiments of the present invention, the image pixels may be arranged in a Bayer pattern comprising red, green and blue image pixels, or according to any other suitable pattern.

In a third aspect, the present invention provides a digital camera comprising an image sensor according to embodiments of the second aspect of the present invention, wherein the non-image pixels are adapted for being used as auto-focus pixels. The digital camera further comprises auto-focus circuitry for generating a control signal and for applying the control signal to a drive mechanism for moving a lens for focusing an image on the image sensor. The digital camera may be for capturing still images, or for recording movies.

Particular and preferred aspects of the present invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIG. 6 illustrates matrix multiplication with a colour correction matrix.

FIG. 9 shows a block diagram of an image sensor according to embodiments of the present invention.

Figure 1:
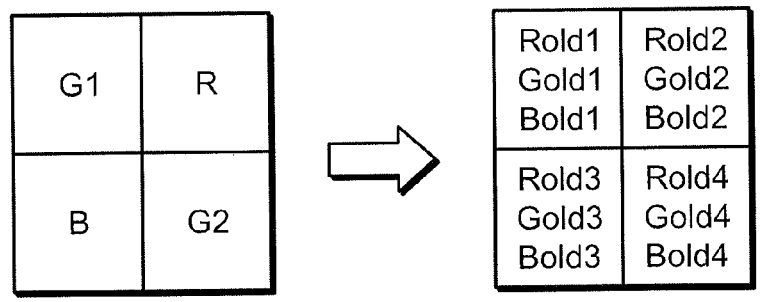
FIG. 1 illustrates (on the left) a basic unit of a Bayer pattern, known in the art, and (on the right) part of a corresponding demosaiced image.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to an image sensor, reference is made to a device which converts radiation, for example visible light, to a signal or plurality of signals, e.g. by photoelectric conversion, in order to encode a spatial distribution of a property of this radiation, e.g. intensity as function of location on an imaging plane of the image sensor. Such image sensor may typically comprise a plurality of pixel elements, e.g. arranged in an array, for determining this property of the radiation at a plurality of locations. For example, an image sensor may comprise a charged coupled device (CCD), which accumulates a small electrical charge in a pixel element when light impinges on this element. These accumulated charges may be converted to a voltage during a read-out phase, e.g. in which all pixel elements are read out sequentially. Additional circuitry may be provided to further encode these voltage levels into digital information. In another example, an image sensor may comprise a complementary metal oxide semiconductor (CMOS) imaging chip, a type of active pixel sensor made using the CMOS semiconductor process. In a CMOS imaging sensor, each pixel element, e.g. photosensor, is provided with integrated semiconductor circuitry, e.g. in the immediate vicinity of the pixel element, to convert the light energy received by the pixel element to a voltage for read-out. This reduces the electrical path length between the pixel element and read-out circuitry compared to a CCD sensor, but increases the manufacturing complexity.

Embodiments of the present invention relate to an image sensor, for example but not limited to a CMOS imager, comprising an array of pixels for detecting radiation. Typically, in such array the pixels are organized in the array in rows and columns. The terms "column" and "row" are used to describe sets of array elements which are linked together. The linking can be in the form of a Cartesian array of rows and columns, however, the present invention is not limited thereto. Also non-Cartesian arrays may be constructed and are included within the scope of the invention. Accordingly the terms "row" and "column" should be interpreted widely. To facilitate in this wide interpretation, there may be referred to "logically organised rows and columns". For example, the rows may be circles and the columns radii of these circles and the circles and radii are described in this invention as "logically organised" rows and columns. By this is meant that sets of pixels are linked together in a topologically linear intersecting manner; however, that the physical or topographical arrangement need not be so. Throughout this description, the terms "horizontal" and "vertical" (related to the terms "row" and "column" respectively) are used to provide a co-ordinate system and for ease of explanation only. They do not need to, but may, refer to an actual physical direction of the device.

As will be understood by those skilled in the art, columns and rows can be easily interchanged and it is intended in this disclosure that these terms be interchangeable. Irrespective of its physical direction, a "column" is meant to indicate a first direction in an array of pixels, for example along which neighbouring pixels are arranged which are typically read out in subsequent scan operations. A "row" indicates a second direction along which neighbouring pixels are arranged which are for example typically read out simultaneously. Row direction and column direction are different directions, for example orthogonal directions.

Where in embodiments of the present invention reference is made to a pixel, reference is made to a location of the image sensor, capable of encoding a property of impinging radiation. Where in embodiments of the present invention reference is made to an "image pixel", reference is made to a location of the image sensor capable of providing image information of an image to be taken. Unless specifically mentioned otherwise, the image pixel includes a colour filter applied on top of the image pixel. For example, in embodiments of the present invention, the image pixels may be overlaid with a Colour Filter Array (CFA) for arranging colour filters, e.g. RGB colour filters, on a grid of photosensors. In particular examples, the CFA may be in the form of a Bayer pattern. Each of the image pixels may basically provide information related to one colour, e.g. either a red value, a green value, or a blue value. Where in embodiments of the present invention reference is made to a "non-image pixel", reference is made to a location of the image sensor capable of providing information of an image to be taken, different from the actual image information. Non-image pixels do not contribute to the normal shooting of an image by means of the image sensor, and are, from point of view of imaging, considered and dealt with as defect pixels.

Where in embodiments of the present invention reference is made to pixels that are "direct neighbours" of other pixels, reference is made to image-pixels that are located directly adjacent to at least one other pixel in a same row or column.

Where in embodiments of the present invention reference is made to "raw image data", reference is made to a digital or analog value provided by the pixels of the image sensor, before any correction has taken place. In the example given above, a red pixel provides a raw red value, a green pixel provides a raw green value, and a blue pixel provides a raw blue value.

Where in embodiments of the present invention reference is made to "full colour data" reference is made to a set of colour components, for example at least three colour components, e.g. (red, green, blue) or (Y, U, V), from which the actual colour in an image at the location of the pixel can be reconstructed.

Where in embodiments of the present invention reference is made to "drop-in pixels" reference is made to "non-image pixels", i.e. pixels of the sensor array that do not provide image data, but can be used for other purposes, e.g. for determining an auto-focus signal.

Where in embodiments of the present invention reference is made to demosaicing, reference is made to a process of colour reconstruction for reconstructing a full colour image from an incomplete colour samples output from an image sensor overlaid with a colour filter.

The present invention relates to solid-state image sensors, e.g. CMOS image sensors. Such sensors can convert incident radiation into image data, but do not provide a perfect colour reproduction. With perfect colour reproduction is meant:

exactly the same perception/observation by the image sensor as by the human eye. Several differences between the human eyes and an image sensor will be described hereinafter.

Many modern CMOS sensors are overlaid with a colour filter array (CFA) for obtaining three (or more) colour components, for example, but not limited thereto, red, green and blue. The following description is mainly referring to red, green and blue colour filter, without being intended to limit the invention thereto. Commercially the most commonly used CFA configuration is the Bayer configuration, illustrated in FIG. 1 (left side). It has a pattern of four pixels arranged in a square, two opposite corners being occupied by green pixels, the other two corners being occupied by a red pixel and a blue pixel. This configuration takes into account that the human eye is more sensitive to green than to red or blue. Alternative colour filters include an increased number of colour channels (more than three), such as CYGM (Cyan, Yellow, Green, Magenta) filters, RGBE (Red, Green, Blue, Emerald) filters, or colour filters that include panchromatic cells, which are cells that are sensitive to all wavelengths of visible light, and hence collect a larger amount of light striking the image sensor, for example CMYW (Cyan, Yellow, Green, White) filters, RGBW (Red, Green, Blue, White) filters.

When reading out the image sensor, each pixel provides a raw colour value, corresponding to the brightness of the part of the impinging radiation ray having a colour corresponding to the colour filter overlaying the pixel. As an example only, without being intended to be limiting for the present invention, the four image pixels shown at the left hand side of FIG. 1 provide two raw green values graw1 (for pixel G1), graw2 (for pixel G2), a raw red value rraw (for pixel R) and a raw blue value braw (for pixel B). In order to obtain a full colour value for each of the pixel locations (for obtaining a full colour full resolution picture), the raw image data needs to be "demosaiced", as shown on the right hand side of FIG. 1. Several demosaicing techniques are known in the art, e.g. the most simple one being "nearest neighbour" wherein a value for a particular colour for a pixel of another colour, e.g. a red value for a non-red pixel (e.g. G1), is simply assigned the value of the particular colour, e.g. the red value, of the nearest pixel of that particular colour, e.g. a red pixel (e.g. the red pixel located at the right hand side of the green G1 pixel). This method works well, as the likelihood of colour information changing brightness in large amounts for any two points next to each other is small, so data from nearby pixels can be reasonably factored in to create an accurate picture. Alternatively, other techniques yielding higher quality are e.g. linear or bilinear interpolation whereby the value for the particular colour for a pixel of another colour, e.g. a red value for a non-red pixel (e.g. G1), is computed as the average of the two or four adjacent pixels of the particular colour, e.g. red pixels (e.g. the average of the red pixels at the left hand side and at the right hand side of green pixel G1). An analogous operation may be carried out for pixels of another colour, e.g. similar operations may be carried out for blue and green values for non-blue and non-green pixels, respectively. More complex methods known in the art may also be used, and need not be further described here. As an example only methods are mentioned that interpolate independently within each colour plane (or sub-image), such as bicubic interpolation or spline interpolation. In the example illustrated in FIG. 1, the demosaiced colour values of pixel x are indicated (Rold1, Gold1, Bold1). Typically the demosaiced colour values Gold1, Rold2, Bold3 and Gold4 of the pixels of the same colour G, R, B, G, respectively, will be set to the raw colour values graw1, rraw, braw and graw2 read from the sensor, corresponding to the image pixels G1, R, B and G2 respectively, while the other colour values (Rold1, Bold1), (Gold2, Bold2), (Rold3, Gold3) and (Rold4, Bold4) are calculated from the raw values of surrounding image pixels by suitable technique, e.g. any of the techniques described above, such as for example linear interpolation.

However, the colour filters used are not ideal, resulting in cross-talk.

Figure 2:
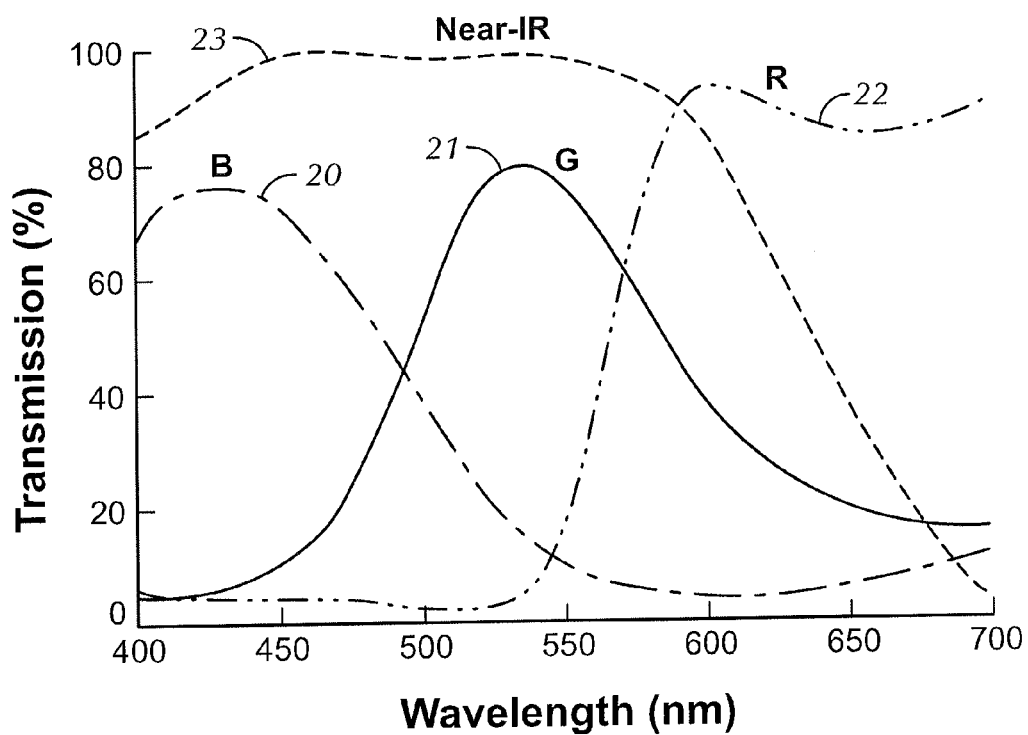
FIG. 2 shows an example of different spectral sensitivity curves of colour filters used for image pixels, and an example of a near-infrared filter to avoid that near-infrared photons "contaminate" the visible information (contrast loss, colour fidelity loss). The figure clearly shows the spectral cross-talk (Blue filter is not 0% in the red, red filter is not 0% in the blue).

A first form of cross-talk to be mentioned is spectral cross-talk. An example of colour filters which may be used are illustrated in FIG. 2, showing the spectral sensitivity curve 20 of a blue image pixel B, the spectral sensitivity curve 21 for a green image pixel G, and the spectral sensitivity curve 22 for a red image pixel R. The spectral cross-talk is caused a.o. by the peak transmission of the various filters not being equal to each other, the overlap between the various colour filters not being perfect (Different colour filters not having same rise and fall characteristics, the crossing of the filters not being right half-way, the colour filters not being located at particular wavelengths), and the transmission of the filters in the stop-band not being zero. An external near-IR filter, the spectral sensitivity curve 23 is illustrated as a dashed line in FIG. 2, which may optionally be present, strongly influences the characteristics of the filter set, and so does the quantum efficiency of the sensor.

Figure 3:
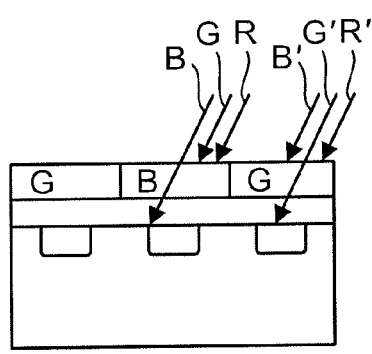
FIG. 3 and FIG. 4 illustrate the effects of optical cross-talk in an image sensor.
Figure 4:
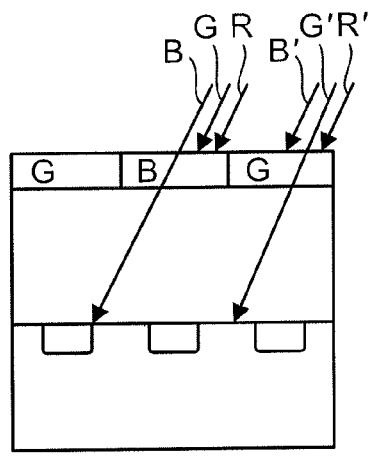

Another form of cross-talk is optical cross-talk, illustrated by FIG. 3 and FIG. 4. FIG. 3 shows the situation without optical cross-talk: an incident light ray of a particular colour, e.g. a blue ray, passes through the colour filter of the corresponding colour, e.g. the blue colour filter, and reaches the active zone of the pixel below the colour filter of that particular colour (as it should), while the light rays of other colours, e.g. green rays and red rays, are blocked (as they should). In the example illustrated in FIG. 4 however, not all the photons impinging on a colour filter of a particular colour associated to a particular pixel will ultimately land in that particular pixel, for example in the embodiment illustrated, the blue ray passing the blue colour filter ultimately reaches the active zone of an adjacent green pixel. This might be due to the thickness of the optical stack, which may allow a photon to pass through a colour filter of a particular colour, but ultimately to land in a pixel of another colour. Other reasons for optical cross-talk may e.g. be diffraction at the edges of the metallization (not shown in the drawings).

Figure 5:
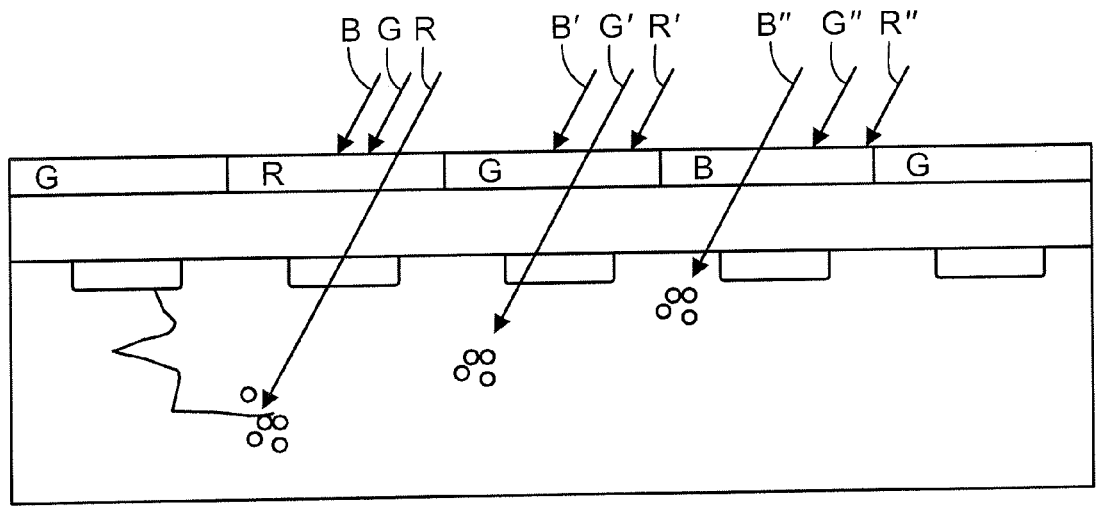
FIG. 5 shows an example of electrical cross-talk in an image sensor.

Yet another form of cross-talk is electrical cross-talk, illustrated in FIG. 5. Once the photons are absorbed by the substrate, e.g. silicon, they generate electron-hole pairs. Electrons generated outside a depletion region, need to diffuse through the substrate to the photodiode regions, but it is not guaranteed that all electrons will end up in the photodiodes they belong to. Some of them might end up into neighbouring pixels. In FIG. 5, a photon belonging to a red light ray, having passed through a red filter, as an example only ends up in the active zone of a green pixel, while it should end up in the active zone of a red pixel.

Figure 7:
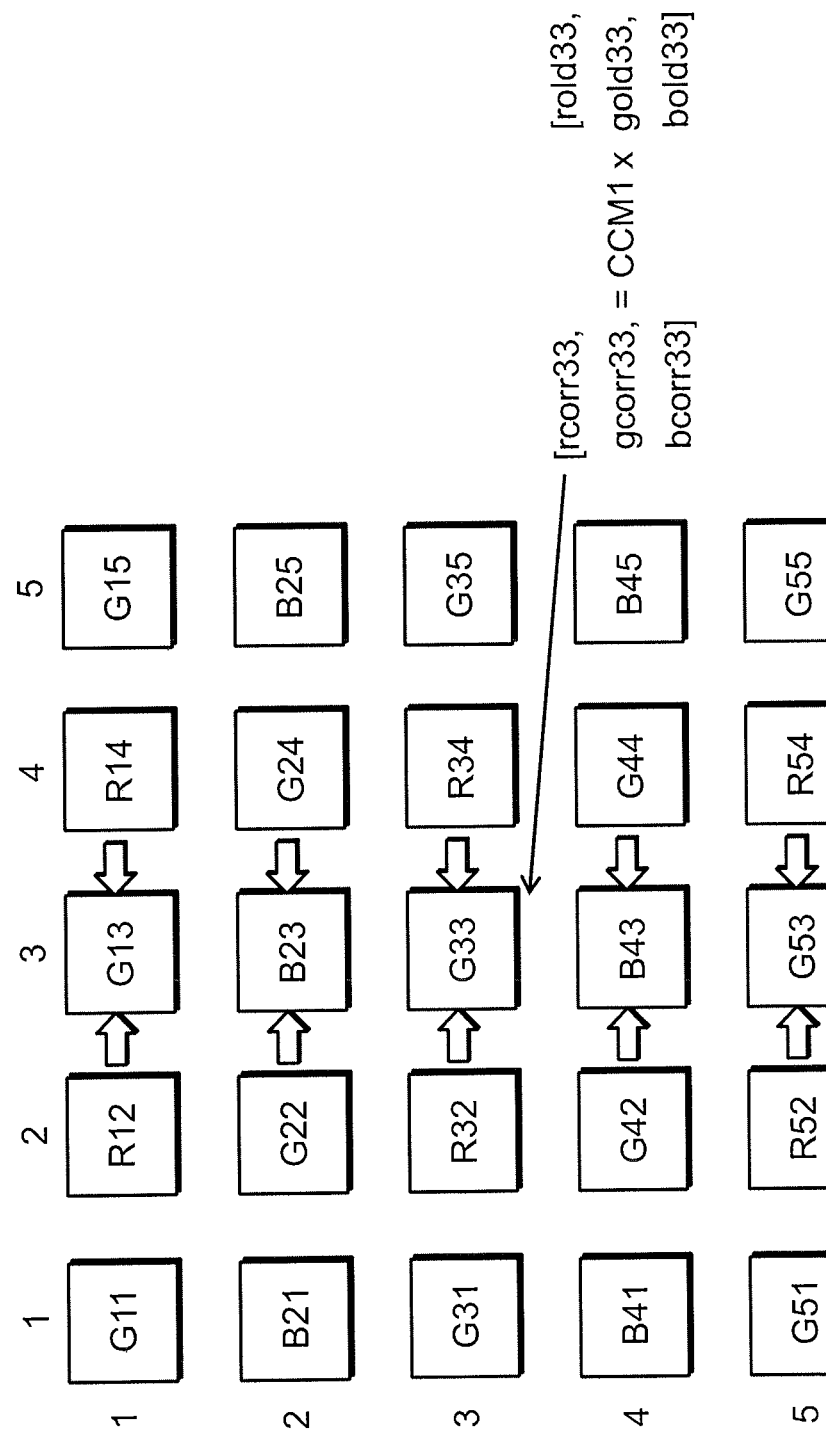
FIG. 7 illustrates horizontal cross-talk to the pixels of a particular column of an image sensor comprising only image pixels.

FIG. 7 illustrates the effects of the combined cross-talk types. Part of an image sensor using a classical Bayer pattern configuration is shown. This is a regular pattern consisting of rows and columns of pixels, where every 2n-th row comprises a sequence of B, G, B, G, B, . . . pixels, and every (2n+1)-th row comprises a sequence of G, R, G, R, G, . . . pixels, or vice versa. These rows are laid out such that every 2j-th column comprises a sequence of R, G, R, G, R, . . . pixels, and every (2j+1)th column comprises a sequence of G, B, G, B, G, . . . pixels. The open arrows in FIG. 7 indicate horizontal cross-talk components (i.e. cross-talk components due to effects in a same row) for the image pixels of the third column illustrated. To limit the complexity of the drawing, only the horizontal cross-talk components are shown, but it will be clear for a person skilled in the art that in reality also vertical cross-talk effects and diagonal cross-talk effects may play. As can be seen, the green pixel G13 gets horizontal cross-talk from the neighbouring red pixels R12 and R14, while the blue pixel B23 gets horizontal cross-talk from the green pixels G22 and G24.

As known in the art, all these sources of cross-talk can be corrected by a so-called colour correction matrix, abbreviated CCM, which is a matrix of correction values, for example in its simplest form where three colours are taken into account a 3×3 matrix of correction values. Using such a CCM, the demosaiced colour component values (in the example illustrated Rold, Gold, Bold) of each image pixel can be corrected and transformed into corrected values (Rcorr, Gcorr, Bcorr) that are also, at the same time corrected for cross-talk. Matrix multiplication is a well-known mathematical technique, but for completeness it is illustrated in FIG. 6. In alternative embodiments, not illustrated in the drawings, other matrices may be used, such as e.g. a 3×4 matrix. In such case for example, besides the demosaiced colour component values (for example Rold, Gold, Bold), also a DC term may be taken into account. The output of the matrix multiplication remains delivering the corrected colour values (Rcorr, Gcorr, Bcorr). It is to be noted that the matrix coefficients m11, m12, ..., m33 may depend on as many as possible, and preferably all, of the imperfections of the colour filters, including for example the spectral cross-talk, the optical cross-talk and the electrical cross-talk and differences in peak transmission of the various filters. The coefficients m11, m22, m33 on the diagonal of the CCM take care about mismatch in peak transmission in the various colour planes, while the off-diagonal coefficients correct for cross-talk and overlap between the three colour planes. Of course, local imperfections on the image sensor are not taken into account, and only a single CCM matrix is calculated for the complete image sensor (e.g. during design or during calibration), which is then used for correcting all image pixels.

Figure 8:
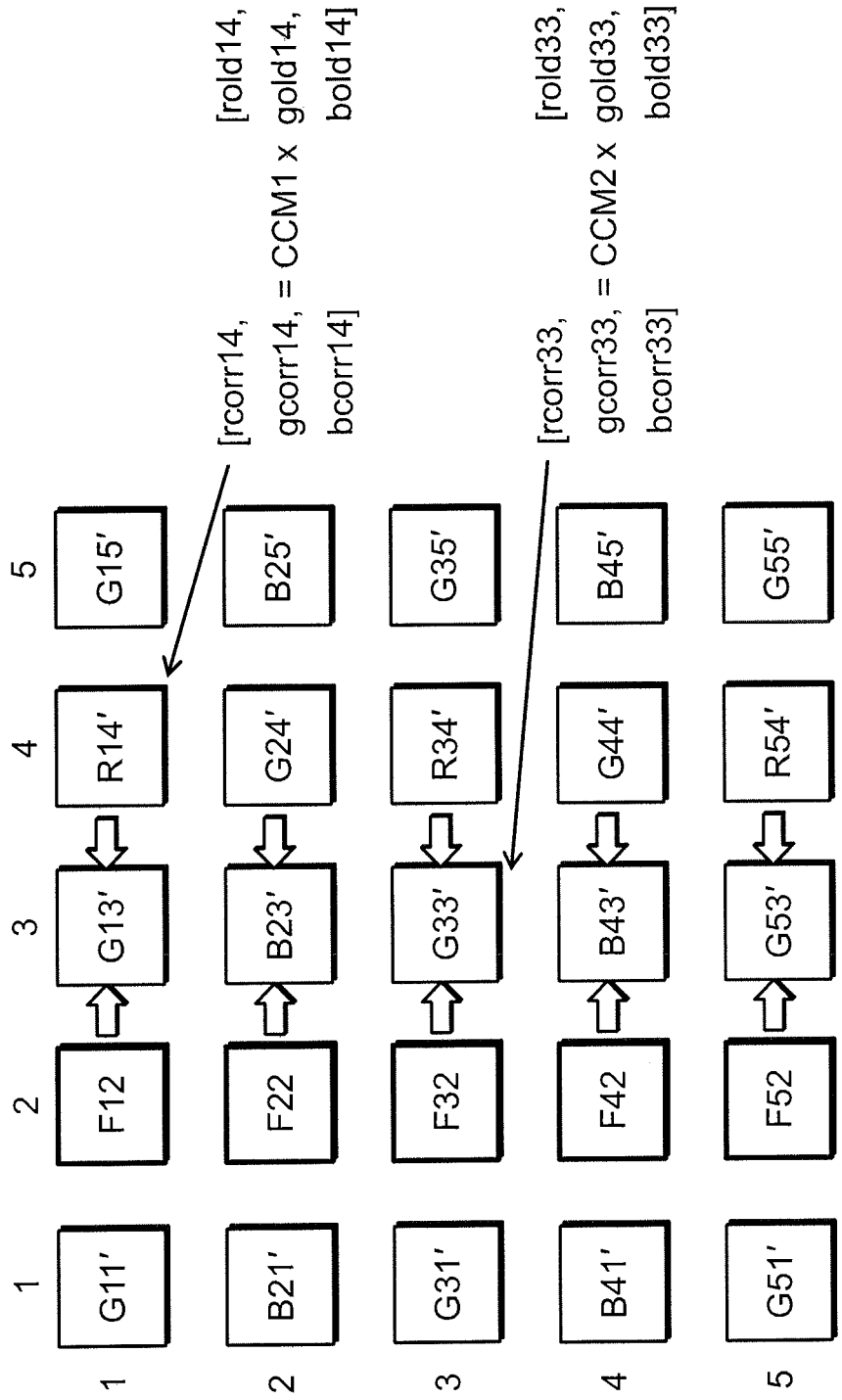
FIG. 8 illustrates horizontal cross-talk to the pixels of a particular column of an image sensor adjacent a column of non-image pixels.

The inventor has found, however, that, in case the image sensor not only comprises image pixels R, G, B (as shown in FIG. 7), but also comprises non-image pixels F (as shown in FIG. 8), such as drop-in pixels which for example can function as auto-focus pixels, the simple matrix-multiplication will not work for pixels close to the non-image pixels F. Despite the fact that these non-image pixels do not contribute to the shooting of an image, and are treated as defect pixels which do not provide image data, they do contribute to the cross-talk towards image pixels R, G, B in the vicinity of the non-image pixels F. Furthermore, because typically the spectral sensitivity of the non-image pixels F is different from that of the image pixels, the cross-talk between the various pixels R, G, B, F will be different as well.

Non-image pixels may have a different colour filter and a different spectral sensitivity than image pixels which in a normal pattern would be located at the same location. As an example, autofocus pixels may be assumed to have a green filter, and to have a sensitivity that is different, for example significantly lower, than a green image pixel.

FIG. 8 illustrates a same part of the image sensor of FIG. 7, where at least part of the second column 2 originally comprising red and green pixels R, G, is now replaced by non-image pixels F, e.g. for use as auto-focus pixels. As in FIG. 7, the open arrows indicate the horizontal cross-talk components to the image pixels G13', B23', etc in the third column. Again, the vertical and diagonal cross-talk components are not illustrated, for clarity of the figure only. When comparing FIG. 7 and FIG. 8, it can be seen that the image pixels of the third column get a similar cross-talk (arrows pointing to the left) from their right neighbours, i.e. the pixels in column 4, but the cross-talk from their left neighbours, i.e. from the non-image pixels F in the second column 2 is different from that in FIG. 7. Specifically, as an example only, the green pixel G33 in FIG. 7 gets cross-talk from:
two red horizontal neighbours R32, R34,
two blue vertical neighbours B23, B43,
four green diagonal neighbours G22, G24, G42, G44,
and the blue pixel B43 in FIG. 7 gets cross-talk from:
two green horizontal neighbours G42, G44,
two green vertical neighbours G33, G53,
four red diagonal neighbours R32, R34, R52, R54.
With the drop-in pixels F12, ..., F52 present, the green pixel G33' in FIG. 8 gets cross talk from:
one red horizontal neighbour R34',
one horizontal non-image neighbour F32,
two blue vertical neighbours B23', B43',
two green diagonal neighbours G24', G44'
two diagonal non-image neighbours F22, F42,
and the blue pixel B43' in FIG. 8 gets cross-talk from:
one green horizontal neighbour G44',
one horizontal non-image neighbour F42,
two green vertical neighbours G33', G53',
two red diagonal neighbours R34', R54',
two diagonal non-image neighbours F32, F52.

In seeking a technique for correcting the cross-talk of the image pixels G13', ..., G53' of the third column, the inventor has surprisingly found that, despite the fact that the cross-talk of these pixels is completely different in case a column of non-image pixels is provided or not, as illustrated in FIG. 8 and FIG. 7, respectively, and hence the regular Bayer pattern in FIG. 8 is completely disturbed, the cross-talk for the image pixels adjacent to the non-image pixels (in the example of FIG. 8 the image pixels in the first and third column) can be successfully reduced by using a second colour correction matrix CCM2, and optionally a further colour correction matrix, and that a more complicated algorithm is not required. For the image pixels R, G, B, not directly adjacent the non-image pixels F (in the example of FIG. 8, e.g. R14', G15', G24', B25', etc.) the same (first) colour correction matrix CMM1 is still used.

The colour correction matrices CCM1, CCM2 and optionally a further colour correction matrix have coefficients that can be calculated by measuring the response of the pixels when a predetermined reference colour pattern, such as e.g. a MacBeth chart, is used as the input image. By means of a controlled light source and appropriate input characteristics of the reference colour pattern, e.g. MacBeth chart, one perfectly knows which signal is coming to the sensor. By measuring and comparing the actual sensor output (i.e. the demosaiced colour values of the raw pixel data) with the input signal, the matrix coefficients for the CCM1 and CCM2 can be calculated. This can e.g. be done on pixel level, or a group of pixels such as for example a row or a column, or on sensor level. In particular embodiments, the matrix coefficients of CCM1 are averaged over all image pixels excluding the direct neighbours of the non-image pixels. And in particular embodiments the matrix coefficients of the colour correction matrix CCM2 according to embodiments of the present invention are averaged over all direct neighbours of the non-image pixels. In this way, the cross-talk of the image pixels directly adjacent to the non-image pixels can be reduced.

Finally, image values for the non-images pixels F12, F22, etc need to be calculated, just like defect pixels need to obtain an image value. There are several possibilities to do so. One alternative starts from the raw image data or demosaiced colour values of image pixels that are not direct neighbours of the non-image pixels (e.g. R14', G15', G24', B25', etc in FIG. 8). Such values may be simply copied towards the readout of non-image pixels, or correction values may be determined e.g. using interpolation such as linear interpolation or bilinear interpolation. The thus obtained full colour values (rold, gold, bold) for the non-image pixels may then be corrected using the first colour correction matrix CCM1.

Another alternative uses also raw image data or demosaiced colour values of image pixels that are direct neighbours of the non-image pixels (e.g. G11', G13', B21', B23', etc in FIG. 8). In this case, a third colour correction matrix CCM3 may be used, the coefficients whereof can also be determined by making use of a reference colour pattern such as the MacBeth chart, as described above and known in the art. It is to be noted that the coefficients of the third colour correction matrix CCM3 may vary depending on the particular interpolation technique being used.

As a third alternative, image data for a non-image pixel F may also be derived from the corrected full colour values (rcorr, gcorr, bcorr) of any of its neighbours, either direct neighbours, or non-direct neighbours. As a theoretical example for illustration purposes only, the corrected full colour values of F32 may be calculated as (rcorr34', (gcorr31'+gcorr33')/2, (bcorr21'+bcorr23'+bcorr41'+bcorr43')/4), but other interpolation techniques may yield better results.

FIG. 9 shows a block diagram of an image sensor 10 according to embodiments of the present invention. The image sensor 10 comprises an image sensor array 11 having a plurality of image pixels R, G, B and a plurality of non-image pixels F, also called "drop-in pixels", e.g. auto-focus pixels, logically organised in rows and columns. The image sensor 10 further comprises a memory 12 for storing raw image data obtained from the pixels in the image sensor array 11, and readout means (not shown) for reading raw image data for each of the image pixels R, G, B and for storing the raw data in the memory 12. The image sensor 10 also has a processor unit 13 connected to the memory 12, and provided with an algorithm adapted for: a) determining a set of colour components rold, gold, bold for each image pixel based on the raw image data stored in the memory 12; b) correcting the set of colour components rold, gold, bold of image pixels R, G, B that are not directly adjacent to the non-image pixels F by means of a first colour correction matrix CCM1, for example by multiplication of the uncorrected full colour date with the first colour correction matrix CCM1; and c) correcting the set of colour components rold, gold, bold of image pixels R, G, B that are directly adjacent to the non-image pixels F by means of a second colour correction matrix CCM2, for example by multiplication of the uncorrected full colour date with the second colour correction matrix CCM2. The processor unit 13 may further be adapted for determining a corrected set of colour components rcorr, gcorr, bcorr for each non-image pixel location F. The result is a corrected full resolution image that may be displayed on a display 14, which typically does not form part of the image sensor 10.

The processor unit 13 may be hardwired embedded electronics, or may be implemented on a programmable processor e.g. a digital signal processor (DSP), which may be embedded in the image sensor 10, or may be an external processor connectable to the image sensor array 11. The coefficients of the colour correction matrices CCM1, CCM2 may be hard-coded, or may be programmable, e.g. in a flash device (not shown) connected to the processor unit 13.

In particular embodiments of the present invention, the non-image pixels F are physically arranged on at least (part of) one column or at least (part of) one row of the image sensor array 11.

In particular embodiments of the present invention, the image pixels R, G, B are arranged in a Bayer pattern comprising red, green and blue (or other coloured) pixels, and the non-image pixels F are arranged on a row or column originally comprising green image pixels G and red image pixels R. In alternative embodiments, the image pixels R, G, B are arranged in a Bayer pattern comprising red, green and blue (or other coloured) image pixels, and the non-image pixels F are arranged on a row or column originally comprising green image pixels G and blue image pixels B. The Bayer pattern mentioned is only one of a series of possible implementations of layouts of colour filters. In yet alternative embodiments, the image pixels may for example be arranged in an RGBW configuration or a variation thereof, a CYGM configuration or a variation thereof, an RGBE configuration or a variation thereof, a CMYW configuration or a variation thereof.

The invention relates also to a digital camera (not shown) comprising the image sensor 10 described above, and further comprising auto-focus circuitry, a drive mechanism and a lens. The non-image pixels F of this sensor are used as auto-focus pixels. The auto-focus circuitry generates a control signal, which is applied to the drive mechanism for moving the lens to a position for focusing an image on the image sensor. More details about such an auto-focus system can be found in US20090167927, and thus need not be further described here. According to embodiments of the present invention, the image provided by a camera comprising an image sensor 10 as described above are colour corrected, and corrected for several forms of cross-talk, in particular also for the pixels directly adjacent of the non-image pixels.

The foregoing description details particular embodiments of the present invention. It will be appreciated, however, that various modifications can be applied to the invention, without leaving the scope of the invention. For example, the CFA need not be a Bayer configuration, but the invention will also work with other colour filter configurations, as cited above or any other type of filter configuration.

The invention claimed is:

1. A method for correcting image data retrieved from an image sensor comprising a plurality of image pixels and non-image pixels, the image pixels being overlaid with a color filter array and having a different spectral sensitivity than the non-image pixels, the method comprising:
   a) determining a set of color components for the image pixels based on raw image data read only from the image pixels of the image sensor, whereby one color component is assigned the raw image data obtained from the sensor for said image pixel, and the other color components are determined from raw image data obtained from the sensor for image pixels in the vicinity of said image pixel;
   b) determining a corrected set of color components for the image pixels that are not directly adjacent to the non-image pixels by means of a first color correction matrix using the formula:

$$\begin{bmatrix} R_{corr} \\ G_{corr} \\ B_{corr} \end{bmatrix} = \begin{bmatrix} m_{11} & m_{12} & m_{13} \\ m_{21} & m_{22} & m_{23} \\ m_{31} & m_{32} & m_{33} \end{bmatrix} \begin{bmatrix} R_{old} \\ G_{old} \\ B_{old} \end{bmatrix}$$

c) determining a corrected set of color components for the image pixels that are directly adjacent to the non-image pixels by means of a second color correction matrix different from the first color correction matrix, using the formula:

$$\begin{bmatrix} R_{corr} \\ G_{corr} \\ B_{corr} \end{bmatrix} = \begin{bmatrix} m'_{11} & m'_{12} & m'_{13} \\ m'_{21} & m'_{22} & m'_{23} \\ m'_{31} & m'_{32} & m'_{33} \end{bmatrix} \begin{bmatrix} R_{old} \\ G_{old} \\ B_{old} \end{bmatrix}$$

whereby the coefficients of the first and second color correction matrix are adapted for simultaneous color transformation and cross-talk correction.

2. The method according to claim 1, further comprising determining the corrected set of color components for the non-image pixels.

3. The method according to claim 2, wherein determining the corrected set of color components for the non-image pixels comprises:
   determining the set of color components for the non-image pixels based on the raw image data of the image pixels; and
   determining the corrected set of color components for the non-image pixels by means of a third color correction matrix.

4. The method according to claim 3, wherein determining the corrected set of color components for the non-image pixels comprises multiplying the set of color components of said non-image pixels with the third color correction matrix.

5. The method according to claim 2, wherein determining the corrected set of color components for the non-image pixels uses raw image data only from image pixels that are not directly adjacent to the non-image pixels, and whereby the third color correction matrix is the same as the first color correction matrix.

6. The method according to claim 2, wherein determining the corrected set of color components for the non-image pixels uses raw image data from at least one image pixel that is directly adjacent to the non-image pixels, and whereby the third color correction matrix is the same as the second color correction matrix.

7. The method according to claim 2, wherein determining the corrected set of color components for the non-image pixels comprises:
   determining the corrected set of color components for the non-image pixels based on the corrected set of color components of one or more image pixels in the vicinity of said non-image pixel.

8. An image sensor comprising:
   a plurality of image pixels overlaid with a color filter array and at least one non-image pixel, the image pixels having a different spectral sensitivity than the non-image pixels, and
   a processor unit adapted for:
   a) determining a set of color components for the image pixels based on raw image data read only from the image pixels of the image sensor, whereby one color component is assigned the raw image data obtained from the sensor for said image pixel, and the other color components are determined from raw image data obtained from the sensor for image pixels in the vicinity of said image pixel;
   b) correcting a set of color components of image pixels that are not directly adjacent to the non-image pixels using the formula:

$$\begin{bmatrix} R_{corr} \\ G_{corr} \\ B_{corr} \end{bmatrix} = \begin{bmatrix} m_{11} & m_{12} & m_{13} \\ m_{21} & m_{22} & m_{23} \\ m_{31} & m_{32} & m_{33} \end{bmatrix} \begin{bmatrix} R_{old} \\ G_{old} \\ B_{old} \end{bmatrix}$$

c) correcting a set of color components of image pixels that are directly adjacent to the non-image pixels using the formula:

$$\begin{bmatrix} R_{corr} \\ G_{corr} \\ B_{corr} \end{bmatrix} = \begin{bmatrix} m'_{11} & m'_{12} & m'_{13} \\ m'_{21} & m'_{22} & m'_{23} \\ m'_{31} & m'_{32} & m'_{33} \end{bmatrix} \begin{bmatrix} R_{old} \\ G_{old} \\ B_{old} \end{bmatrix}$$

whereby the coefficients of the first and second color correction matrix are adapted for simultaneous color transformation and cross-talk correction.

9. The image sensor according to claim 8, wherein the processor unit is further adapted for determining the corrected set of color components for the non-image pixel locations.

10. The image sensor according to claim 8, further comprising a memory for storing image data for the image pixels, the processor unit being operatively connected to the memory.

11. The image sensor according to claim 10, wherein the processor unit is further adapted for determining the set of color components for the image pixels based on raw image data stored in the memory.

12. A digital camera comprising an image sensor according to claim 8, wherein the non-image pixels are adapted for being used as auto-focus pixels, the digital camera further comprising auto-focus circuitry for generating a control signal and for applying the control signal to a drive mechanism for moving a lens for focusing an image on the image sensor.

* * * * *